United States Patent

Williams

[11] Patent Number: 5,887,687
[45] Date of Patent: Mar. 30, 1999

[54] BRAKE ASSEMBLY

[75] Inventor: Ronald L. Williams, Pasco, Wash.

[73] Assignee: Wheco Corporation, Pasco, Wash.

[21] Appl. No.: 780,945

[22] Filed: Jan. 10, 1997

[51] Int. Cl.[6] .................................................. F16D 51/00
[52] U.S. Cl. ...................................... 188/330; 188/79.55
[58] Field of Search ............................... 188/79.55, 330, 188/315, 78.51

[56] References Cited

U.S. PATENT DOCUMENTS

| | | | |
|---|---|---|---|
| 2,781,868 | 2/1957 | House | 188/330 |
| 3,307,661 | 3/1967 | Bostwick | 188/79.55 X |
| 3,894,620 | 7/1975 | Goldberg | 188/330 X |
| 4,484,665 | 11/1984 | Svensson | 188/79.55 |
| 4,981,200 | 1/1991 | Gee | 188/330 X |
| 5,044,475 | 9/1991 | Clark | 188/330 X |

FOREIGN PATENT DOCUMENTS 1902798  8/1970  Germany ............................. 188/79.55

Primary Examiner—Peter M. Poon
Attorney, Agent, or Firm—Davis Wright Tremaine

[57] ABSTRACT

A brake assembly for vehicles has a back plate with brake shoes and actuating members mounted thereto. A cam shaft and cam member are disposed through a radial extension on the back plate, such that when a brake pedal is depressed an actuator shaft is moved laterally. A linkage member interconnects the actuator shaft and the cam shaft so that linear movement of the actuator shaft is converted into rotational movement of the cam shaft. The cam member is disposed between the brake shoes so that when the cam shaft and cam member move rotationally, the brake shoes are moved radially and into frictional engagement with the brake drum.

5 Claims, 4 Drawing Sheets

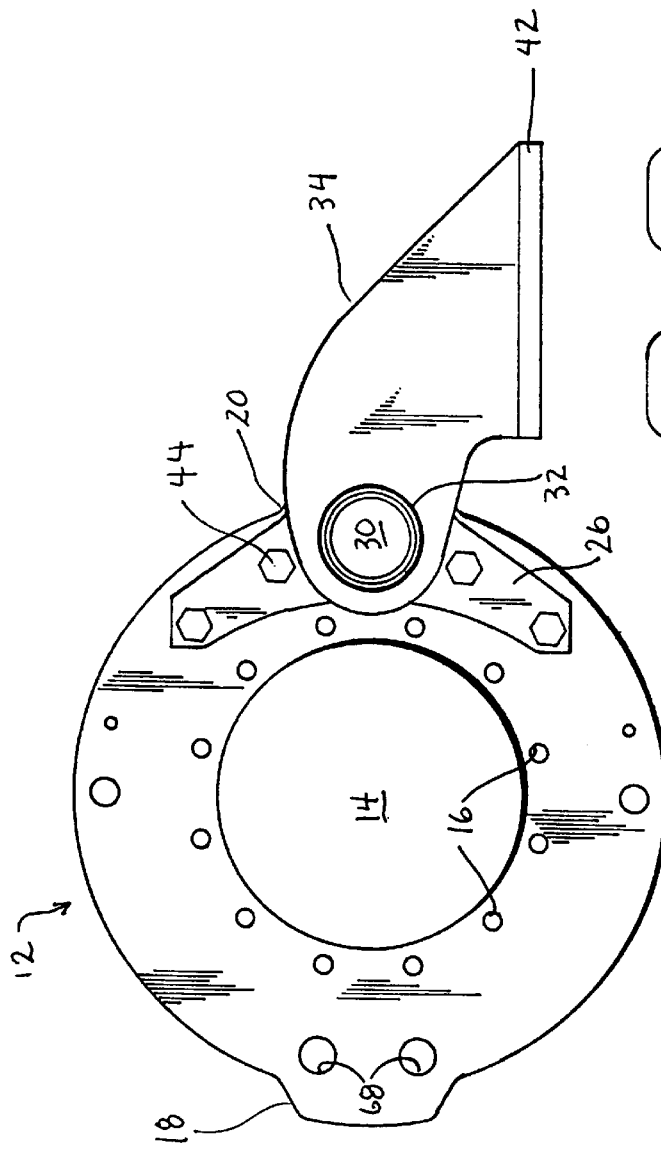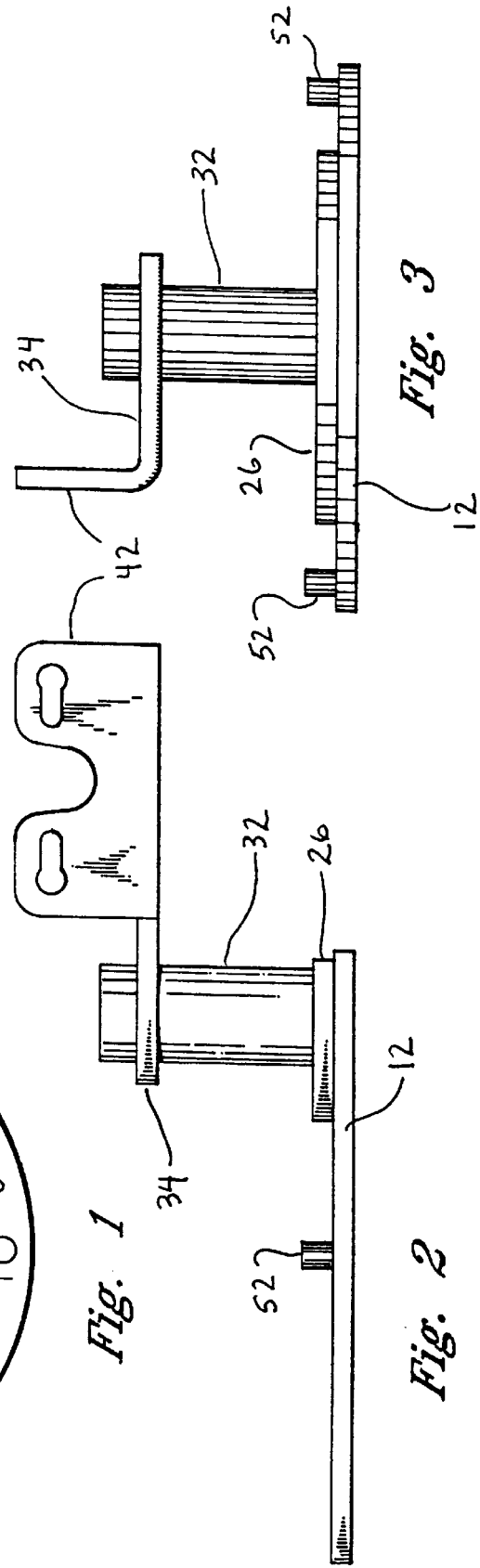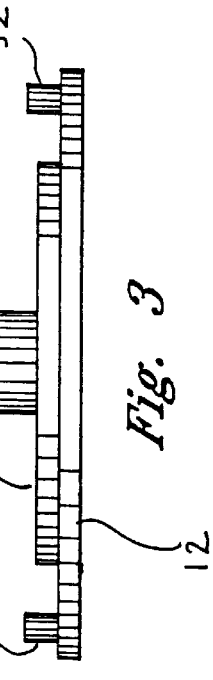

BRAKE ASSEMBLY

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to a drum brake arrangement for vehicles. More specifically, the invention relates to a novel arrangement of the various parts of the invention on a back plate especially designed to support the device on an axle housing.

Drum brakes are well known, and have been used for years on all kinds of vehicles. For example, in U.S. Pat. No. 5,477,945 a drum brake arrangement is disclosed wherein a brake camshaft is supported via a bearing on a carrier and the end of the camshaft that supports the slack adjuster is supported via a support bearing at the axle body. The slack adjuster is provided with a worm gear that is fixedly connected to the brake cam shaft for adjusting the drum brake arrangement according to wear of the brake pads.

BRIEF SUMMARY OF THE INVENTION

The brake assembly of the present invention is characterized by a planar back plate apparatus adapted for securement about an axle housing to support the remainder of the apparatus. The back plate comprises a planar member with a central aperture through which the vehicle axle is positioned and to which the plate is secured. A pair of brake shoes are pivotally secured at a first end adjacent a first radial extension of the back plate. A second radial extension of the back plate defines an aperture through which a cam shaft is positioned. The cam shaft is provided with a cam member on the end thereof, which interacts with a second end of the brake shoes such that when the cam shaft is rotated, the cam forces the brake shoes apart from one another and into frictional engagement with the brake drum.

The actuation of the cam shaft occurs when the brake pedal is depressed, thereby actuating an actuator shaft which is linked to a second end of the cam shaft. For example, this end of the cam shaft may be splined and adapted to interfit in driving is engagement with a splined linkage mechanism which translates the linear movement of the actuator shaft to the rotational movement of the cam shaft.

In the broadest embodiment, the brake assembly comprises:

a. a brake cylinder having an actuator shaft;
b. a linkage member interconecting the actuator shaft and a cam shaft, and adapted to translate linear movement of the actuator shaft into rotational movement of the cam shaft;
c. a cam member affixed to the cam shaft;
d. a circular backing plate having first and second radial extensions thereon, defining a central aperture through which the axle shaft is positioned, and an aperture in the first radial extension through which the cam shaft is disposed;
e. a pair of brake shoes pivotally affixed adjacent the second radial extension;
f. a pair of rollers engaging opposite sides of the cam member so that when the actuator shaft is moved laterally, the cam shaft and cam are rotated and the brake shoes are forced radially outwardly, such that pads on the brake shoes are forced into frictional engagement with the brake drum.

BRIEF DESCRIPTION OF THE DRAWINGS

The object and advantages of the present invention will appear more clearly from the following specification in conjunction with the accompanying drawings, in which:

FIG. 1 is a top plan view of the configuration of the back plate and the first and second mounting brackets;

FIG. 2 is a first side view of the apparatus of FIG. 1;

FIG. 3 is a second side view of the apparatus of FIG. 1;

DETAILED DESCRIPTION OF THE INVENTION

Figure 4:
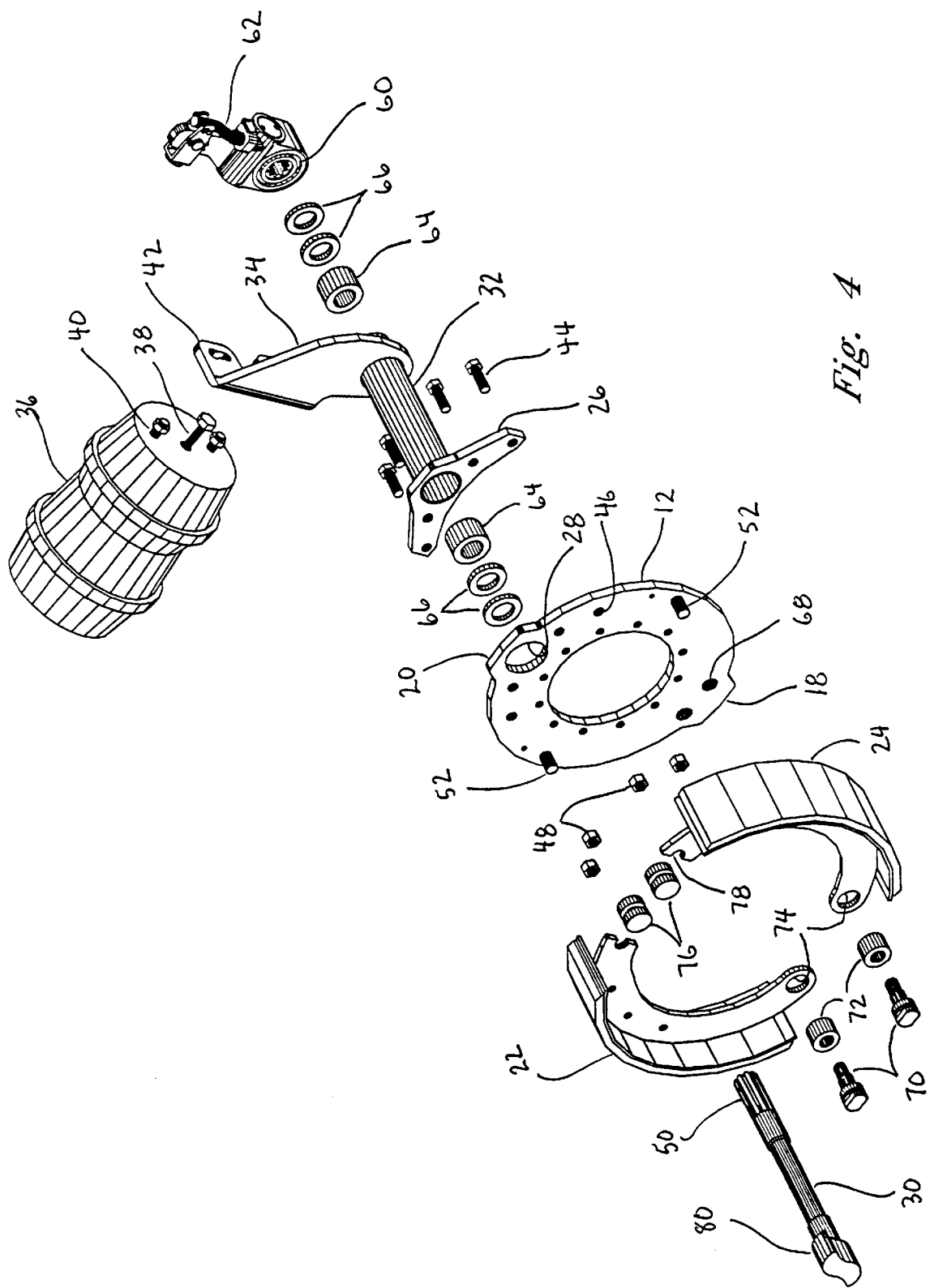
FIG. 4 is an exploded view of the brake system of the present invention.

As illustrated in FIG. 1, the brake system of the present invention comprises a novel back plate 12 which defines a central aperture 14 through which the vehicle axle passes, and a plurality of apertures 16 through which the plate 12 is secured to the axle housing (not shown). The back plate 12 is provided with first and second radial extensions 18, 20 onto which are secured, respectively, the brake shoes 22, 24 and the first mounting bracket 26. The second radial extension 20 defines an aperture 28 through which the cam shaft 30 and guide sleeve 32 are directed. The second mounting bracket 34 is affixed to one end of the sleeve 32 while the first mounting bracket 26 is affixed to the other end of the sleeve 32.

FIG. 4 illustrates the configuration of the various components of the inventive brake assembly. A brake cylinder 36 in the form of a pneumatic actuator is provided with a first actuator shaft 38. The cylinder 36 is secured to the second mounting bracket 34 by bolts 40 through flange 42 on bracket 34. In turn, the first mounting bracket is mounted to the back plate 12 by bolts 44 through apertures 46 in plate 12, and secured with nuts 48. The cam shaft 30 is disposed within guide sleeve 32 such that the splined male end 50 of shaft 30 interfits in driving engagement with the cooperating splined female receptacle 60 of the self-adjusting actuator linkage mechanism 62. Appropriate bearings 64 and spacers/washers 66 are provided to enable efficient operation of the shaft 30 within sleeve 32.

Brake shoes 22, 24 are pivotally affixed to the first radial extension 18 of the back plate 12 at apertures 68, secured through apertures 74 with bolts 70 and bushings 72. Spacing of the brake shoes from the back plate is maintained by a pair of spacers 52. A pair of rollers 76 interfit with projections 78 on brake shoes 22, 24. When inserted into the guide sleeve 32, a cam mechanism 80 on the end of cam shaft 30 is positioned between the rollers 76.

Figure 5:
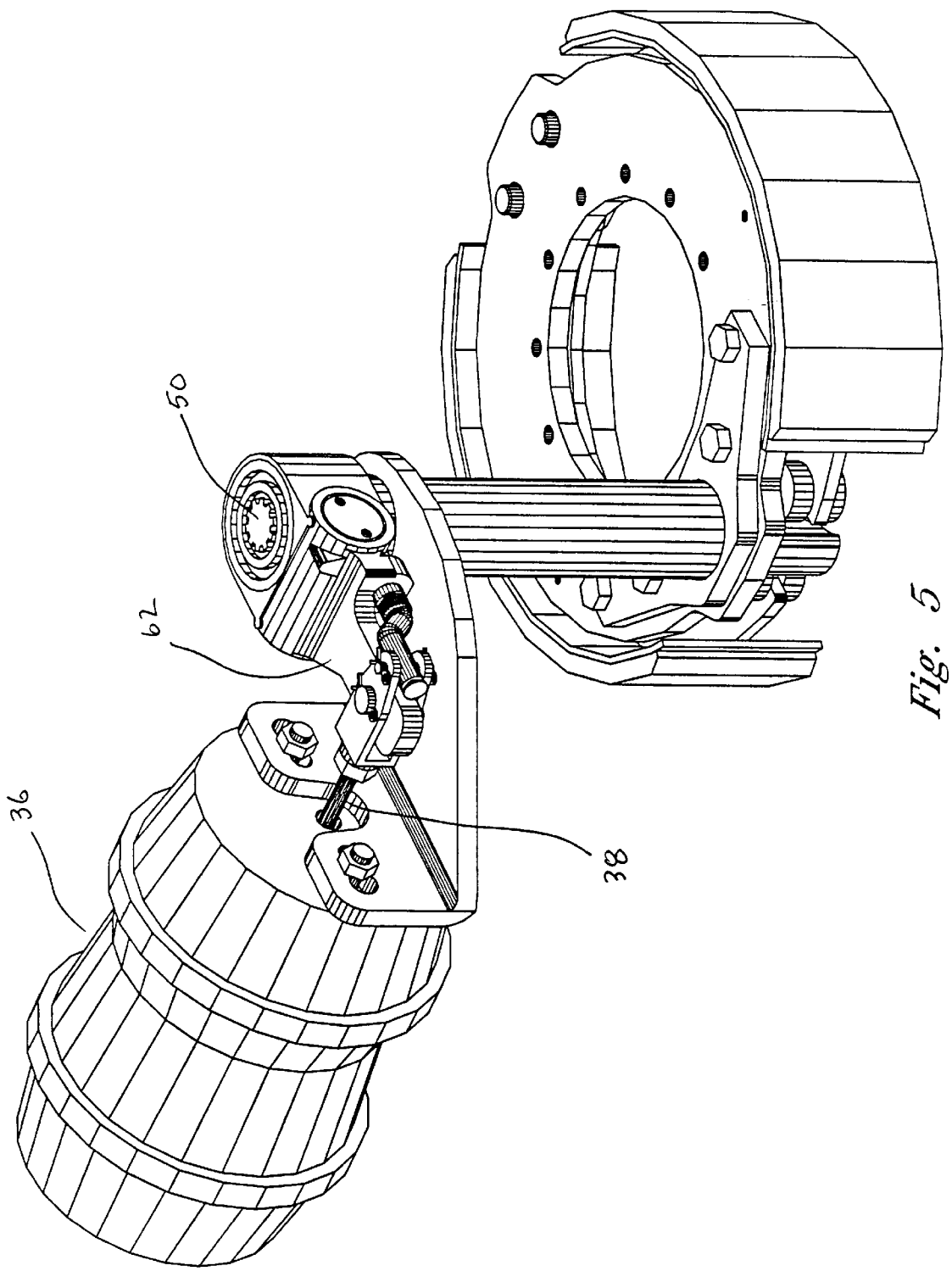
FIG. 5 is a first perspective view of the assembled brake system of the present invention.
Figure 6:
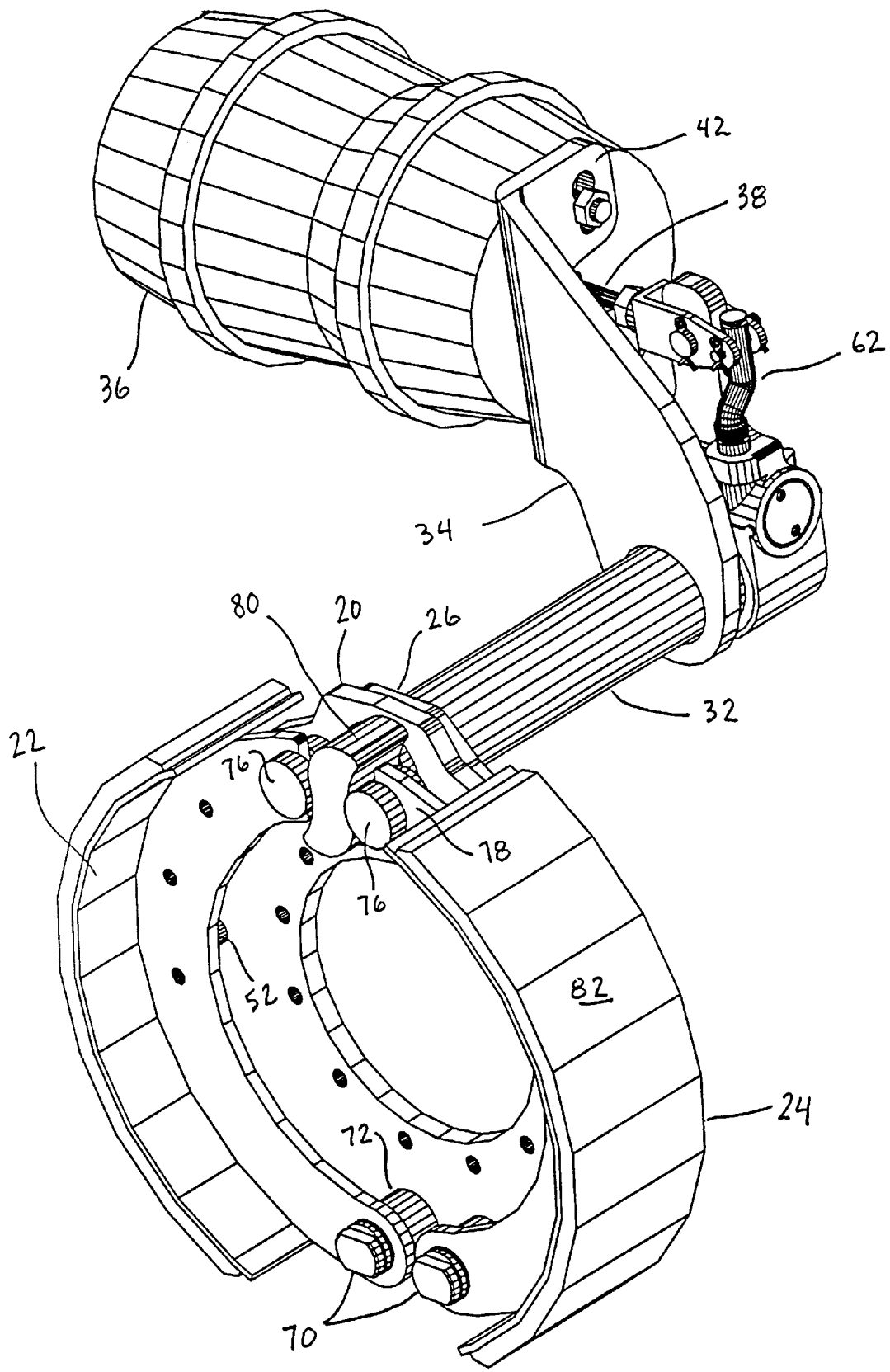
FIG. 6 is a second perspective view of the assembled brake system of the present invention.

The assembled brake assembly is illustrated in FIGS. 5 and 6. When a brake pedal (not shown)is depressed, the first actuator shaft 38 is actuated. The splined male end 50 of cam shaft 30 is engaged with the female splined receptacle 60 of the linkage mechanism 62 (which is well known in the art and is not described in detail herein), such that when the shaft 38 is extended, the linkage mechanism 62 causes the cam shaft 30 to rotate about its longitudinal axis within the guide sleeve 32. Rotation of the cam shaft 30 induces rotation of the cam 80. The cam 80 is positioned between the pair of rollers 76, so that rotation of the cam 80 causes the rollers, and therefore the brake shoes 22, 24 to move radially, relatively farther apart from one another, with the pads 82 bearing against the brake drum. It is to be understood that while the brake assembly disclosed herein is disclosed in the context of a pneumatic actuator, other actuation mechanisms well known to those skilled in this art (such as mechanical, hydraulic, etc.) may be utilized.

The brake assembly of the present invention is particularly described herein, with a preferred embodiment disclosed and illustrated. It is to be understood that the instant invention is not to be limited solely to the embodiment disclosed, but is intended to encompass any modification or improvements within the scope of the appended claims.

I claim:

1. A brake assembly apparatus comprising;
   a. a brake cylinder having a first actuator shaft therein;
   b. a linkage member interconnecting the first actuator shaft and a first end of a cam shaft, and adapted to induce rotational movement of the cam shaft about a longitudinal axis;
   c. a cam member affixed to a second end of the cam shaft;
   d. a planar circular back plate having first and second radial extensions from an outer edge thereof, and defining an aperture in the first radial extension through which the cam shaft is disposed;
   e. a pair of brake shoes rotatably affixed at the location of the second radial extension and extending longitudinally beyond the outer edge of said planar back plate, said brake shoes adapted to frictionally engage a bearing surface; and
   f. a pair of adjacent roller members, one of said roller members affixed to each brake shoe and interfitting with a surface of the cam member,
   wherein when the first actuator shaft is extended, the cam shaft and cam member are rotated about the longitudinal axis such that the brake shoes are forced into engaging relationship with said bearing surface.

2. The apparatus of claim 1, wherein the back plate defines a plurality of apertures such that the back plate is fixedly secured to an axle housing.

3. The apparatus of claim 1, wherein the cam shaft is provided within a guide sleeve.

4. The apparatus of claim 3, wherein a first mounting bracket is secured to a first end of the guide sleeve, and a second mounting bracket is secured to a second end of the guide sleeve.

5. The apparatus of claim 4, wherein the first mounting bracket is secured to the back plate.

* * * * *